US012284118B2

(12) United States Patent
Kozak et al.

(10) Patent No.: US 12,284,118 B2
(45) Date of Patent: Apr. 22, 2025

(54) CONTENT DISTRIBUTION AND OPTIMIZATION SYSTEM AND METHOD FOR LIMITING EVENT TRAFFIC FOR CLIENT COMPUTING DEVICES

(71) Applicant: WarnerMedia Direct, LLC, New York, NY (US)

(72) Inventors: Serhii Kozak, Anderson Island, WA (US); Jiming Ye, New York, NY (US); Elias Mendel, Seattle, WA (US); Agnelo D'costa, Redmond, WA (US); Aeden Jameson, New York, NY (US); Jing Yang, Bothell, WA (US); Chase Meador, Sammamish, WA (US); Brandon Sislow, Seattle, WA (US); Bradley C LeRoss, New York, NY (US); Pam McCormack, Bellevue, WA (US); Nicolas Webb, Bothell, WA (US)

(73) Assignee: WarnerMedia Direct, LLC, New York, NY (US)

( * ) Notice: Subject to any disclaimer, the term of this patent is extended or adjusted under 35 U.S.C. 154(b) by 437 days.

(21) Appl. No.: 17/561,514

(22) Filed: Dec. 23, 2021

(65) Prior Publication Data
US 2023/0208764 A1 Jun. 29, 2023

(51) Int. Cl.
*H04L 47/20* (2022.01)
(52) U.S. Cl.
CPC .................. *H04L 47/20* (2013.01)

(58) Field of Classification Search
CPC ........................................................ H04L 47/20
See application file for complete search history.

(56) References Cited

U.S. PATENT DOCUMENTS

2017/0289226 A1* 10/2017 Deshpande ...... H04N 21/25866
2022/0014473 A1* 1/2022 Matthews ............ H04L 47/2441
2022/0200863 A1* 6/2022 Kotalwar ............ H04L 41/0886

* cited by examiner

Primary Examiner — Faruk Hamza
Assistant Examiner — Alan L Lindenbaum
(74) Attorney, Agent, or Firm — Alston & Bird LLP

(57) ABSTRACT

A content distribution and optimization system that receives a plurality of event traffic bursts, generated by a first client computing device, in a first pod from a partition of a messaging bus. Messaging bus is partitioned based on a device identifier (ID) of the first client computing device and comprises a plurality of application launch timestamps. A filtering rule is configured for the device ID of the first client computing device for checking a rate limit of each event traffic burst. First set of event traffic bursts is blocked based on number of events exceeding a threshold value of rate limit of an event traffic burst generated by the first client computing device until a new fixed window is assigned. Event traffic communicated to a metrics aggregation controller is limited to pre-defined rate for the first client computing device. Enrichment of remaining second set of event traffic bursts is performed.

20 Claims, 4 Drawing Sheets

CONTENT DISTRIBUTION AND OPTIMIZATION SYSTEM AND METHOD FOR LIMITING EVENT TRAFFIC FOR CLIENT COMPUTING DEVICES

CROSS-REFERENCE TO RELATED APPLICATIONS/INCORPORATION BY REFERENCE

None.

FIELD OF TECHNOLOGY

Certain embodiments of the disclosure relate to a content distribution and optimization system. More specifically, certain embodiments of the disclosure relate to a content distribution and optimization system and method for limiting event traffic for client computing devices.

BACKGROUND

Recent advancements in the field of content creation and distribution are triggering massive expectations on what the delivery of viewing experiences should entail. There is now a greater emphasis on providing content choice, brand loyalty, and personalization with the preferences and expectations of a viewer at the center of every media content offering. This has organically led to a paradigm shift from broadcast workflows to direct to consumer (DTC) content delivery models where all consumers are able to access whatever content they want to view on a preferred device at any time that suits them. To evolve with the growing brand loyalty towards, for example, particular sports players, teams, and bands, the content providers are beginning to turn to breakthrough modes of media content delivery.

A content provider may correspond to free television broadcasters (for example, local broadcasters, such as NBC®, and Fox®), for-pay television broadcasters (for example, ESPN®, and Cinemax®), and/or web-based content providers (for example, streaming content from web sites). The content provider may also include modules for video optimization and monitoring. While delivering content, video monitoring modules in the content provider may see large event drops throughout the day, which may result in drops in quality of service (QoS) metric. One reason for such drops may be burst in event traffic from certain devices sending events at a high rate (for example, 1000+ requests per minute) due to certain errors. All such events are sent to the same partition in messaging bus based on serial number keys of the devices. The consumer reading from such partition may get overwhelmed and start to lag behind resulting in metric drop. Alternatively, if certain metrics are dropped to stay near real-time, the drop metrics may appear to be an outage to the consumers.

In order to handle such spikes in the event traffic, in certain scenarios, existing solutions implement a standard web application firewall load balancer that detects the internet protocol (IP) address of one or more computing devices but fail to handle the range of the computing devices that generate the spike in event traffic. In other scenarios, the existing solutions implement a rate limiter at ingress point at the application programming interface (API) level. Such rate limiters may limit the spike in the event traffic based on the IP address but may cause to lose metrics for digging into while receiving burst traffic in the first place.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for content distribution and optimization system and method for limiting event traffic for client computing devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
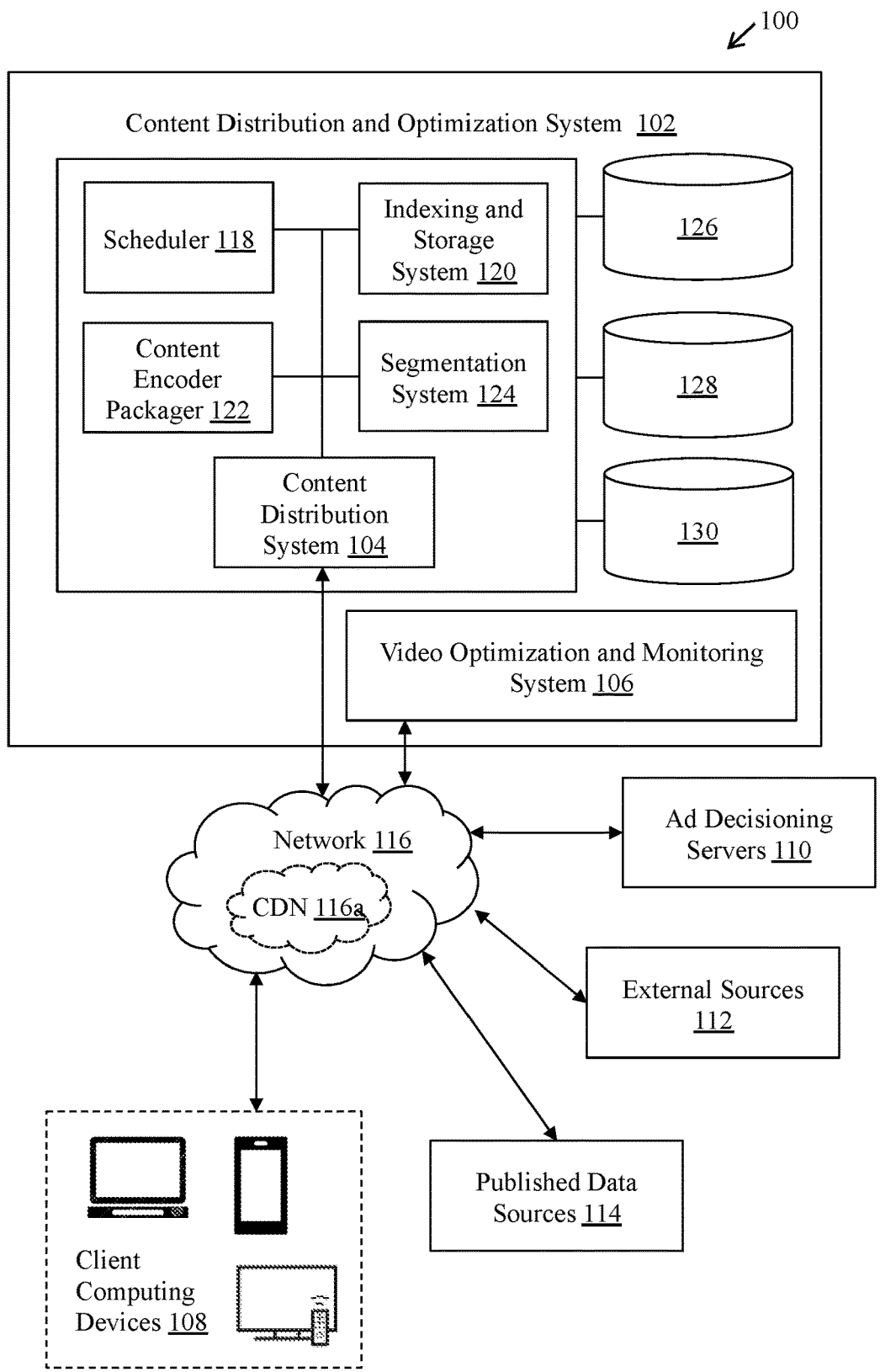
FIG. 1A is a block diagram that illustrates an exemplary system for limiting event traffic for client computing devices, in accordance with an exemplary embodiment of the disclosure.

Certain embodiments of the disclosure may be found in a content distribution and optimization system and method for limiting event traffic for client computing devices. Various embodiments of the disclosure provide a content distribution and optimization system and method that limits per-device traffic coming to a metric aggregation engine to reasonable rate (for example, 100 per minute) and stores events from the spike in persistent storage for further analysis. The proposed content distribution and optimization system and method prevents brownouts to the API infrastructure or event data consumers and ensures that the event traffic is still captured for logging and debugging. Thus, the proposed content distribution and optimization system and method allows to still collect the data for offline analysis and forward it onto the Lambda or batch space processing which could scale while limiting impact to real-time metric users.

In accordance with various embodiments of the disclosure, a content distribution and optimization system and method is provided that receives a plurality of event traffic bursts in a first pod from a partition of a messaging bus. The plurality of event traffic bursts is generated by a first client computing device and communicated to the partition of the messaging bus. Each event traffic burst corresponds to a number of events in a time duration corresponding to a fixed window. The messaging bus is partitioned based on a device identifier (ID) of the first client computing device and comprises a plurality of application launch timestamps. A filtering rule may be configured for the device ID of the first client computing device for checking rate limit of each event traffic burst. A first set of event traffic bursts from the plurality of event traffic bursts may be blocked based on number of events corresponding to the event traffic burst exceeding a threshold value of rate limit of an event traffic burst generated by the first client computing device until a new fixed window is assigned. Event traffic communicated to a metrics aggregation controller is limited to a pre-defined rate for the first client computing device based on the blocking of the first set of event traffic bursts. An enrichment of remaining second set of event traffic bursts from the plurality of event traffic bursts may be performed.

In accordance with an embodiment, the method may further comprise creating a per pod lookup table corresponding to a plurality of client computing devices in the memory. For each pod, a corresponding lookup table comprises at least a threshold value of rate limit of an event traffic burst generated by a corresponding client computing device.

In accordance with an embodiment, the method may further comprise storing the blocked first set of event traffic bursts generated by the first client computing device in the first pod and debugging the blocked first set of event traffic bursts for offline analysis to protect the content distribution and optimization system from fault tolerance of the event traffic bursts.

In accordance with an embodiment, the method may further comprise replaying events when the filtering rule is misconfigured.

In accordance with an embodiment, the method may further comprise configuring the filtering rule based on at least an IP address, a user ID, and a profile ID for checking rate limit of each event traffic burst.

In accordance with an embodiment, the API response time corresponding to a serialization controller remains unchanged.

In accordance with an embodiment, the method may further comprise publishing events in a cloud data warehouse based on one or more of a first, a second, or a third condition. In accordance with the first condition, the rate limit of each event traffic burst for the first client computing device is disabled. In accordance with the second condition, the threshold value exceeds the number of events corresponding to the event traffic. In accordance with the third condition, the remaining second set of event traffic bursts from the plurality of event traffic bursts are unblocked.

In accordance with an embodiment, the method may further comprise logging the remaining second set of event traffic bursts in a cloud object storage. The second set of event traffic bursts may be consumed by a cloud data warehouse from the cloud object storage.

FIG. 1A is a block diagram that illustrates an exemplary system 100 for limiting event traffic for client computing devices, in accordance with an exemplary embodiment of the disclosure. Referring to FIG. 1A, the system 100, comprises a content distribution and optimization system 102 that further includes a content distribution system 104 and a video optimization and monitoring system 106. The system 100 further comprises client computing devices 108, Advertisement (Ad) decisioning servers 110, external sources 112, published data sources 114, and a network 116 (or a content delivery network (CDN) 116*a*). The content distribution and optimization system 102 may include further components, such as a scheduler 118, an indexing and storage system 120, a content encoder packager 122, a segmentation system 124, a media content master storage system 126, a media content metadata storage system 128, and a schedules, rights, and user preferences (SRU) database 130 associated with the content distribution system 104.

The content distribution and optimization system 102 may comprise suitable logic, circuitry, and/or interfaces that may be configured to execute code that handles content comprising audio, video, images, metadata, manifests, and/or other data that is embedded and/or referenced externally. In this regard, the content distribution and optimization system 102 may provide video programming services to viewers for a subscription fee, such as pay television. The content distribution and optimization system 102 generates on-demand disparate media output streams to be viewed on each of the client computing devices 108. In accordance with certain embodiments, the content distribution and optimization system 102 may also handle distribution, for example, multicasting, unicasting, broadcasting, streaming, for one or more channels to be viewed on one or more of the client computing devices 108. The media content may include a video, an audio, a combination of audio and video presentations, a combination of audio, video, a combination of multiple-audio, multiple-video, and/or embedded or externally referenced metadata. The media content may also include metadata, such as game scores, statistics, or timings, social media, cast/character/credits, geo-spatial data, and/or still-images or graphics (referenced or embedded), associated with the audio/video presentation.

The content distribution and optimization system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, a content provider or operator, and network provider or network operator may be utilized to refer to the entity related to handling or distribution of media content, interchangeably. The broadcast provider may handle a single channel, a plurality of channels, or one or more CDNs. The broadcast provider may be configured to distribute content via one or more platforms, for example, traditional over-the-air broadcast channels, radio, cable television networks, satellite communication networks, the Internet, and/or other content delivery networks. In a broadcast chain, the broadcast provider may receive actual content (for example, from a production studio) in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus.

The content distribution and optimization system 102 may receive the MPTS, which includes the signaling content and metadata, from a broadcast provider based on current society of cable telecommunication engineers (SCTE) standards (SCTE-35 and SCTE-224) to control web and regional blackouts, network end of day switching, and advertisement insertion. For example, the content distribution and optimization system 102 may be signaled for various blackout types with in-band SCTE-35 message. Examples of the content distribution and optimization system 102 may include direct-broadcast satellite (DBS) providers, cable television (CATV) systems, and other wireline video providers and competitive local exchange carriers (CLECs) using IPTV.

The content distribution system 104 may comprise suitable logic, circuitry, and/or interfaces that may be configured to execute a code to generate a disparate media output stream to be viewed on a client computing device, in accordance with the specified play schedule, such as a programming schedule provided by the scheduler 118. Based on the programming schedule, the content distribution system 104 may be configured to generate live media output streams to be delivered to one or more of the client computing devices 108 over a web page, a web service, or an installed application (i.e. app). In accordance with an embodiment, the content distribution system 104 may generate a specific live media output stream corresponding to a live media content. In accordance with an embodiment, the content distribution system 104 may be configured to insert media segments that are referenced by manifests associated with a plurality of pre-encoded media assets (stored in the indexing and storage system 120) into a disparate media output stream manifest. The insertion may be based on intervals equal to a content segment duration to generate a disparate media output stream. The manifest may correspond to a text-based instruction set that may instruct the client computing devices 108 which and where to acquire the pre-encoded media assets for playout. The disparate media output stream, thus generated, is in a suitable state (or ready) to be distributed to web media players or apps in one or more of the client computing devices 108.

The decisioning as to which of the pre-encoded media assets to select for delivery over the network 116 to the one or more of the client computing devices 108 may be based on the manipulation of the manifests that correspond to the programming schedules in real time or near-real time. The manipulation of the manifests may be based on the programming schedules that may be driven by, for example, real time or near-real time content context analysis, user-selection on the client computing devices 108, or external data received from the external sources 112, in addition to the real-time data, such as desired channel theme, content metadata, pre-specified content rights, content availability, content eligibility, and stream operator preferences, received from various databases.

The content distribution system 104 may also be referred to as a stream manipulator that may be configured to insert media segments from live content or pre-stored media content, in an existing program stream, based on manipulation of manifests corresponding to programming schedule of the existing program stream. The insertion of live content, pre-stored media content, pre-encoded media assets, and/or the like may be driven by real time or near-real time content context analysis, user-selection on the client computing devices 108 or driven by external data received from the external sources 112. Alternatively, both the live or pre-stored programming content (such as long-form presentations, short-form presentations, news or sporting events) and non-programming content (such as paid advertisements, public service advertisements, or promotional material), may be dynamically scheduled, and inserted to create new streams based on real time or near-real time (or with a certain lag time) manipulation of the manifest corresponding to the programming schedule.

The video optimization and monitoring system 106 may comprise suitable logic, circuitry, and/or interfaces that may be configured to execute code to obtain comprehensive video Quality of Service (QoS) metrics available for operational reporting and alarming so that the quality of video stream delivered for each of the client computing devices 108 can be maximized. The video optimization and monitoring system 106 may be utilized for detecting service issues that matter to client computing devices 108 so that the content distribution and optimization system 102 can rapidly respond to the issues to allow for a high-quality user experience. The video optimization and monitoring system 106 may enable assessment of collected events and data that is associated with the content delivery, the network 116 and the client computing devices 108 in order to effectively manage service offerings and detect and respond to issues prior to requests raised by the users. In accordance with an embodiment, the video optimization and monitoring system 106 may be configured to utilize network measurements to infer quality of experience (QoE).

In accordance with an embodiment, the video optimization and monitoring system 106 may utilize the video QoS metrics for operational reporting and alarming so that the quality of video stream delivered for each client computing device may be maximized. The video optimization and monitoring system 106 may generate an automated report comparing week over week, month over month, and year over year video QoS metrics so that anomalous behavior can be identified, and action items may be driven for improvement in the user experience. For reporting, the filtration may be performed based on various dimensions, such as content, device, geo location and network available within the video QoS metrics. In accordance with an embodiment, the video optimization and monitoring system 106 may perform investigation by video playback error/event types. In accordance with an embodiment, the video optimization and monitoring system 106 may be configured to report the 99th percentile of Video QoS metrics in less than 5 minutes from time of event firing on a client computing device to aggregate statistic to ensure that response can be generated within incident service-level agreement should an issue be identified.

The client computing devices 108 may refer to end-user devices or consumption devices where the content is played and consumed by a user. The number of impressions of a media item, such as an advertisement and/or promotional media, on such plurality of client computing devices 108 determine the advertising impact or promotion impact and number of actual audiences achieved during campaigns. Examples of the client computing devices 108 may include, but are not limited to connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, embedded devices, or any process/system capable of processing the output for any means, regardless of the capability or intent to decode for media presentation, and on which the consumer may launch a web page, a web application, or a web service to view media content.

The Ad decisioning servers 110 may comprise suitable logic, circuitry, and/or interfaces that may be configured to execute code to determine which advertisements, overlay graphics and presentation information to serve to the client computing devices 108 based on a stream ID, a program ID, a geolocation, time, and preferences associated with an individual users or advertisement ID. The Ad decisioning servers 110 may implement at least an advertisement decisioning component that may be used during a real-time content or advertisement placement activity, for example during dynamic ad insertion. For example, commercial or non-commercial advertisements may be dynamically inserted within program segments of a media asset based on the detected upcoming indicator, such as an inbound trigger, a signaling point, and/or a signal in a source stream by the Ad decisioning servers 110.

The external sources 112 may include third-party content providers that may provide pre-encoded assets to the content distribution and optimization system 102. The external sources 112 may further include third-party platforms that may store audience data corresponding to subscribers of the plurality of client computing devices 108. The audience data may include demographics data, audience targeting data, trending data, device type data, device platform data, and content recognition-based data. The trending data also comprises information on what's trending based on social engagement, such as number of likes or votes to a particular media item, or number of people watching a particular media item on the social networks (or platforms), such as Twitter®, Facebook®, and the like. The trending data may indicate an aggregate interest level of a number of users in the social networks for a particular media item. For example, a thousand or more shares, or likes by a number of users may indicate a highly popular media item.

Each of the published data sources 114 may comprise suitable logic, circuitry, and/or interfaces that may be configured to execute code that provides actual audiences for programs that were distributed. As illustrated in FIG. 1A, the published data sources 114 are coupled to the content distribution and optimization system 102 via the network 116 and configured to monitor audience drift to or away. The published data sources 114 may provide actual audiences for programs to the indexing and storage system 120. An exemplary published data source may be Nielsen. Nielsen has the capability to determine when a viewer watches the same set of media items, for example, advertisements and/or promotional content, in programming data, such as an episode within 3 days of original airing and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The network 116 may be any kind of network, or a combination of various networks, and it is shown illustrating the communication that may occur between the content distribution and optimization system 102 and the other data sources, devices, and/or systems. In accordance with various embodiments, the network 116 may comprise one or more of a cable television network, the Internet, a satellite communication network, a wide area network (WAN), a medium area network (MAN), a local area network (LAN), or a CDN 116a.

The CDN 116a may be or may include one or more suitable internet protocol based networks for transmitting content data, such as media content, to servers or remote users. A CDN service provider typically maintains a number of computers in a network that can maintain content from various content providers. In turn, content providers can instruct, or otherwise suggest to, the client computing devices 108 to request some, or all, of the content provider's content from the computers of a particular CDN service provider. Preferably, the CDN 116a is load balanced and fault tolerant at the client level. The CDN 116a may be configured to provide media content to the plurality of client computing devices 108 via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an IP-based content delivery/distribution network, and/or the like.

The scheduler 118 may comprise suitable logic, circuitry, and/or interfaces that may be configured to execute a code that creates and handles a programming schedule of pre-encoded or on-demand media assets. The programming schedule of the pre-encoded or on-demand media assets defines which pre-encoded or on-demand media assets should be scheduled, time and duration at which the pre-encoded or on-demand media assets should be played in the generated disparate media output streams, the ordering of the pre-encoded or on-demand media assets during playout, and when to distribute the media content to the client computing devices 108 over the web application, service or page. The scheduler 118 may create the programming schedule based on a desired theme, content metadata, content rights, content eligibility, and content availability of the pre-encoded or on-demand media assets. The scheduler 118 may also provide the capability to format non-programming break, such as ad break, durations and locations, as well as graphic overlay locations on the pre-encoded or on-demand media assets displayed on the client computing devices 108. The media content that is distributed may include both the programming content, such as long-form presentations, short-form presentations, news or sporting events, and non-programming content, such as paid advertisements, public service advertisements, or promotional material. In accordance with an embodiment, the programming schedule may comprise data structures or file formats capable of being processed by a computer, that comprise a reference mapping of different media content items that needs to be utilized by the content distribution system 104.

The scheduler 118 may generate an instruction set as the programming schedule for each disparate media output stream to be generated and informs the content distribution system 104. In accordance with an embodiment, the programming schedule may be a text file or an eXtensible Markup Language (XML) file, which comprises a reference mapping of different media content items or media segments of the pre-encoded media assets.

The indexing and storage system 120 may comprise suitable logic, circuitry, and/or interfaces that may be configured to be ingested with a plurality of manifests associated with the plurality of pre-encoded media assets. The indexing and storage system 120 may also store, process, and generate aggregate viewing information based on various data feeds received from the external sources 112 and the published data sources 114. In accordance with an embodiment, the indexing and storage system 120 may be configured to ingest the manifests of the pre-encoded media assets, and perform indexing of the listed media segments, indexing of program boundaries and tag markings, advertisement break locations, overlay opportunities credits, digital rights management systems supported in the indexing and storage system 120.

The media content master storage system 126 may comprise suitable logic, circuitry, and/or interfaces that may be configured to store master versions of the media content. The master versions may be used as the source for creating the On-Demand or pre-encoded media assets for the client computing devices in the required formats.

The media content metadata storage system 128 may comprise suitable logic, circuitry, and/or interfaces that may be configured to store media content metadata. The media content metadata may include metadata associated with media content segments stored in the media content master storage system 126. Examples of the media content metadata may include a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 128 may also store program-specific information (PSI) data as defined by ISO/IEC 13818-1 (MPEG-2), closed captioning data, and subtitles associated with the media content segments stored in the media content master storage system 126. Other forms of metadata may be utilized without departing from the spirit and scope of the various embodiments of the disclosure.

The content encoder packager 122 may comprise suitable logic, circuitry, and/or interfaces that may be configured to execute code to determine a package that includes media content and associated metadata. The content encoder packager 122 may be directly coupled to the indexing and storage system 120. Thus, the content encoder packager 122 encodes and packages the media content into the required on-demand formats for delivery to the client computing devices 108. The media content may correspond to one or more of the plurality of media segments transcoded to different types of streams for different types of devices, such as a TV or a mobile device, and marked with Nielson markers. Based on such a package, a corresponding media content distribution device may dynamically generate one or more encoded content assets for playout to the client computing devices 108 communicatively coupled through the CDN 116a.

The segmentation system 124 may comprise suitable logic, circuitry, and/or interfaces that may be configured to breaks each encoded stream into time slices (for example, 10 second period) and then place the stream of packets for that period into a standard file format container that includes the packets and metadata describing the content (for example, MP4 container). Such a container may be stored in the content distribution system 104.

The SRU database 130 may comprise suitable logic, circuitry, and/or interfaces that may be configured to store the schedules for all source feeds, availability rights for all the content in the schedules, regional blackout zones for the various sports leagues, predefined location-based viewing preferences, individual client viewing preferences, and any viewing or transition rules provided by the stream owner operator. The SRU database 130 may further store one or more constraints and rights associated with disparate media output streams based on which one or more functionalities may be enabled. The SRU database 130 may further store a set of rules governing when and how media content may be used. For example, when the media content may be made available On-Demand, if the media content may be made available over the Internet, whether the media content may be used in a disparate live media output stream and the timeframe, or is the user allowed to restart the media content when streamed. The SRU database 130 may further store index of previous content selections of each user for media content that may be used to personalize and organize the user experience going forward.

In operation, content from the sources associated with the content distribution and optimization system 102 and the external sources 112 may provide content, such as video content, in a defined format, such as MPEG packets, within an IP datagram stream to the headend of the content distribution and optimization system 102. The content may be stored in the media content master storage system 126 for future processing and playout, or the content may be made available in substantially real-time or after a pre-determined time delay and be provided to the content encoder packager 122. The content may be encoded as the single stream and packaged into multiple streams, each encoded into a different resolution format and bit rate. The multiplicity of different stream formats and bit rates enables the content to be sourced to computing devices with different capabilities, such as a smart phone, a personal computer, and a tablet computer. After encoding, the segmentation system 124 may be configured to break each stream into time slices (for example, 10 second period) and place the stream of packets for that period into a standard file format container that includes the packets and metadata describing the content (for example, MP4 container). The content distribution system 104 may be configured to publish such files to the CDN 116a for smart distribution to the edges of the network, i.e. the smart phone, personal computer, and tablet computer. The DTC apps in the client computing devices 108 may pull the files from CDN 116a by using standard unicast HTTP Gets. Various examples of an adaptive streaming protocol may be unicast HTTP Live Streaming (HLS), HTTP Dynamic Streaming (HDS) and IIS Smooth Streaming.

In accordance with an embodiment, the DTC apps installed in the client computing devices 108 that describe the video QoS delivery status may fire heartbeat events at regular intervals, for example every 30 seconds. Examples of such heartbeat events may include, for example, streaminitiate (indicating that the play has been initiated and the stream has been requested), videoqosstart (indicating that the video has started successfully playing), videoqosstatechange (indicating that content type is changing from main asset to an ad asset), videoqoserror (indicating that an error has occurred), videoqosend (indicating that the video has been sent), and the like. In some instances, some of the client computing devices may start giving errors and the heartbeat events may measure up to thousands of events times per minute, thereby generating event traffic bursts.

In such embodiment, a rate limiter instrumented in an enrichment layer of the video optimization and monitoring system 106 may receive the plurality of event traffic bursts in a first pod from a partition of a messaging bus and configure a filtering rule for the device ID of such client computing devices for checking rate limit of each event traffic burst. The rate limiter may check various conditions, as described in detail in FIG. 1B, to determine if the events corresponding to the event traffic bursts are to be blocked or published in persistent storage and the messaging bus as well, so as to be consumed by different consumers, for example a cloud object storage and a metrics aggregation engine. Further, if blocked, the events may be debugged for offline analysis to protect the content distribution and optimization system 102 from fault tolerance of the event traffic bursts.

Figure 1B:
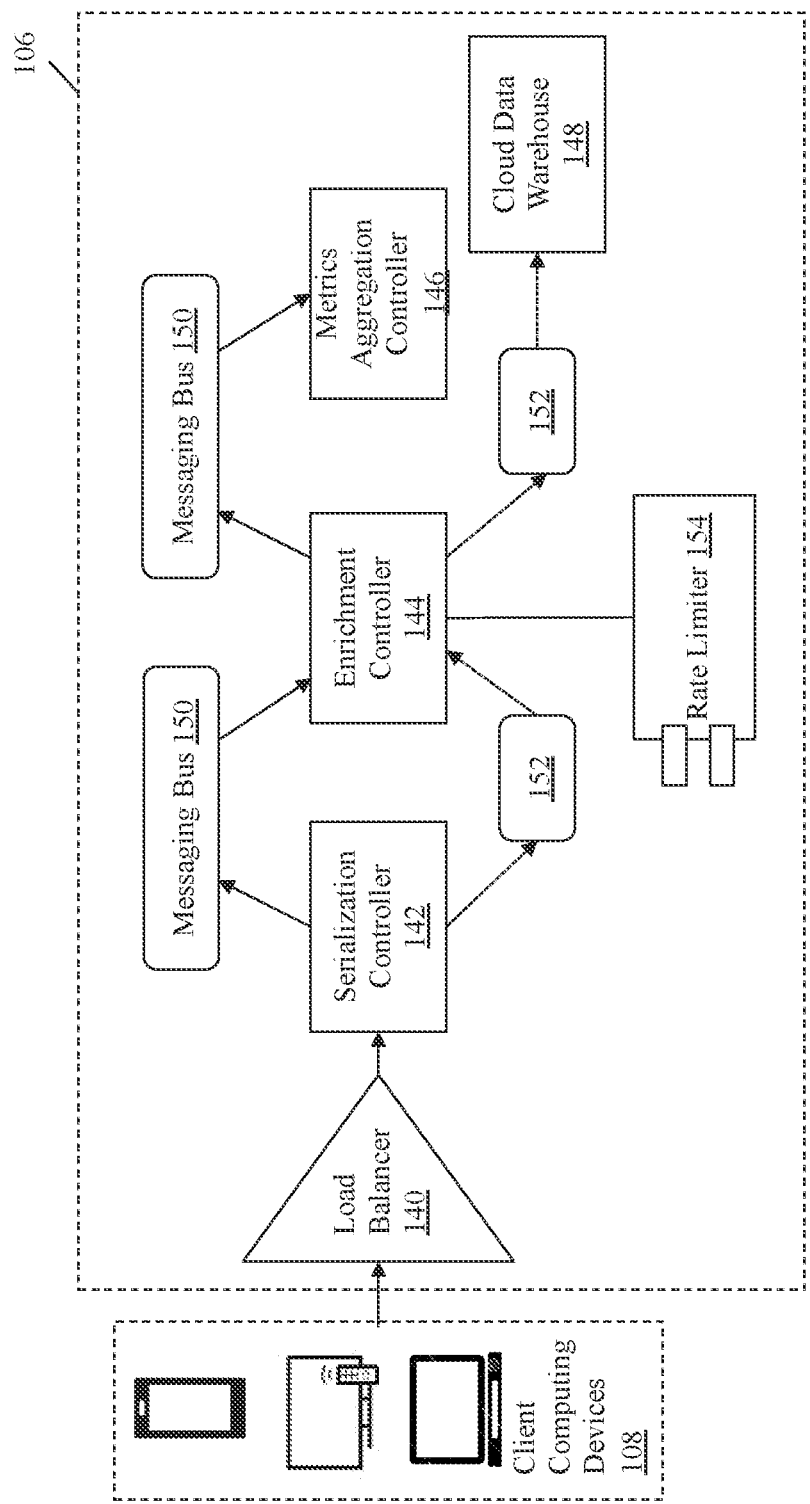
FIG. 1B is a block diagram that illustrates an exemplary content optimization and monitoring system, such as the video optimization and monitoring system, in accordance with an exemplary embodiment of the disclosure.

FIG. 1B is a block diagram that illustrates an exemplary content optimization and monitoring system, such as the video optimization and monitoring system 106, in accordance with an exemplary embodiment of the disclosure. FIG. 1B is described in conjunction with FIG. 1A. With reference to FIG. 1B, the video optimization and monitoring system 106 is illustrated to include various components, such as a load balancer 140, a serializer controller 142, an enrichment controller 144, a metrics aggregation engine 146, and a cloud data warehouse 148. The video optimization and monitoring system 106 may further include a messaging bus 150, a cloud object storage 152, and a rate limiter 154.

With reference to FIG. 1B, such a variety of components may be configured to collectively realize a data pipeline that receives events from the client computing devices 108 in response to the disparate streaming content being played out at each of the client computing devices 108. The events may be an identifiable unit of data that conveys information about an occurrence. An event may have a timestamp indicating when the event occurred, a set of dimensions indicating various attributes about the event, and a set of metrics related to the event. In accordance with an embodiment, the events may correspond to user-generated events, such as, but not limited to, video start and video stop. In accordance with an embodiment, the events may correspond to system-generated events, such as heartbeat events that are emitted after every, for example 30 seconds, to describe the video QoS delivery status. In accordance with an embodiment, the events may include network flow variables, device information, user and group information, or information on an application (e.g., resource condition, variables and custom triggered events). An event typically represents a message, token, count, pattern, value, or marker that may be recognized within a NRT data stream, such as network traffic, specific error conditions or signals, thresholds crossed, counts accumulated, and so on.

The data pipeline may be defined as a sequence of operations performed on a group of event tuples from one or more near real-time (NRT) data streams. In one implementation, the group may be formed on a tuple-by-type basis. In another implementation, the group may be formed on batch-by-batch basis. In some implementations, each data pipeline may be identified by a unique data pipeline ID. In one implementation, multiple NRT data streams can source data to one or more data pipelines. In another implementation, an NRT data stream is queued to a task sequence in a single pipeline, which in turn is processed over a single container.

In accordance with an embodiment, the video optimization and monitoring system 106 may correspond to a stream processing framework that may be defined as a real-time stream processing system. In accordance with an embodiment, the stream processing framework may process NRT data streams to generate real-time analytics. The stream processing framework may be built using APIs (application programming interfaces) and deployed as a cluster, referred to as a container. The container may be designed to manage distribution of tasks within a given infrastructure and the API may be designed to handle message passing, task discovery and fault-tolerance.

The load balancer 140 may be configured to act as a reverse proxy to handle inputs, i.e. the video QoS events as HTTP traffic, received from the client computing devices 108 for access to web servers, i.e. the content distribution and optimization system 102. In accordance with various embodiments, the load balancer 140 may be configured to perform various functions in addition to just splitting traffic across the content distribution and optimization system 102. Non limiting examples of such functions may include, HTTP reverse proxy, traffic and routing optimization algorithms, image caching (reducing web server load), content caching, compression, content switching and rewriting, SSL encryption/decryption (further reducing server load), single Sign-On (preventing users having to login when switched between servers), GEO (GSLB) and DNS Failover, cookie persistence, HTTP/2 Proxy, and Web Application Firewall (WAF). Since the load balancer 140 is located between the client computing devices 108 and the content distribution and optimization system 102, the load balancer 140 may enhance the user experience by providing additional security, performance, resilience and simplify the scaling of the content distribution and optimization system 102.

In accordance with an embodiment, the public addresses associated with service domain names corresponding to the content distribution and optimization system 102 point to the load balancers. The load balancer 140 may be configured to generate a query for the back-end web servers, i.e. the content distribution and optimization system 102, instead of the client computing devices 108 interacting with such back-end web servers directly.

In accordance with an embodiment, the load balancer 140 may be connected with a Web Application Firewall (WAF) that can analyze HTTP traffic and identify attacks based on a database of known attacks. A WAF does not replace the network firewall and is normally deployed between the network firewall and the web server infrastructure, i.e. the content distribution and optimization system 102. To provide maximum protection, the WAF may be required to be able to analyze HTTPS as well as HTTP and so will need to terminate (decrypt) the SSL encrypted traffic.

With access to the HTTP and HTTPS traffic streams, the WAF may be configured to analyze the passing traffic to identify and mitigate rogue and malicious content. For example, the WAF may identify such content by matching against known attack signatures in signature database, by limiting the size of requests, and by identifying content patterns, such as credit card numbers. In accordance with an embodiment, the WAF may provide regular updates to the signature database to provide protection against the latest exploits as well as offering tools to create custom signatures.

The serializer controller 142 may comprise suitable logic, circuitry, and/or APIs that may be configured to act as an HTTP collection end point or service for accepting the incoming traffic of events across various platforms, such as DTC apps. In an exemplary scenario, the schema of such events may correspond to raw JavaScript Object Notation (JSON) records. The serializer controller 142 may function as an ingress point and may be configured to flush such events in the raw JSON records to the cloud object storage 152, such as S3, on a periodic basis. Additionally, the serializer controller 142 may be configured to provide the raw JSON records to the messaging bus 150 also. The serializer controller 142 may perform various functions. For example, one function may be to ensure that events that are being received, meet the credentials/dimensions that are expected. Another function may be to provide an authentication mechanism for the connecting client computing devices 108.

The enrichment controller 144 may comprise suitable logic, circuitry, and/or APIs that may be configured to retrieve raw events from the cloud object storage 152 and the event stream from the messaging bus 150. The enrichment controller 144 may correspond to a post-processing layer that may be further configured to enrich or augment the data and the base events from the event streams, divide into small micro batch partitions, and save the enriched data set back out to cloud object storage 152 and send the enriched streams to the messaging bus 150. In accordance with an embodiment, the enrichment or the augmentation may pertain to geographic information about where the user's IP address belongs to. In accordance with an embodiment, the enrichment controller 144 may lookup the information about the account and apply privacy compliance regulations to the events as such events flow through the controller. The enrichment controller 144 may further create a mechanism for which batch-based consumers may access the data.

Various data exchange processes may be configured to retrieve one or more (or all) partitions of the enriched data set from the cloud object storage 152 and forward the enriched data set on to various end points. The enrichment controller 144 may be communicatively coupled to a plurality of data consumers that may apply transformations, augment the atomic events, and route metrics to various endpoints inclusive of Graphite®, Splunk®, segment, and operational DB for customer service tools. In accordance with an embodiment, the video QoS events in monitoring tools, such as Graphite®, ImmortalDB®, and StatsD®, may be routed to an analytics and interactive visualization web application, such as Grafana®, for alarming on via the plurality of data consumers communicatively coupled to the enrichment controller 144. The enrichment controller 144 may store the enriched data back in the cloud object storage 152 and the messaging bus 150 as well.

The metrics aggregation engine 146 may comprise suitable logic, circuitry, and/or APIs that may be configured to aggregate the real-time and high-volume stream of events from the messaging bus 150 based on a business logic. The metrics aggregation engine 146 may be an open source system, such as Flink®, that derives health metrics of the content distribution and optimization system 102 using a set of SQL aggregation queries. Various examples may include, video playback failure, video start failure, number of seconds to start video playback, number of rebuffering events emitted, and the like.

The cloud data warehouse 148 may comprise suitable logic, circuitry, and/or APIs that may be configured to store the enriched data and video model metrics in depersonalized form. In accordance with an embodiment, such data may be used to monitor playback failures by a client computing device when new features are rolled out, based on various dimensions of the event traffic, such as Video Playback Failures, Device Type, Date, and the like. Such business value may be pertinent for a consumer business group, such as technical operations group. In accordance with another embodiment, such data may be used to obtain top titles viewed this week based on various dimensions of the event traffic, such as Asset Name and Date. Such business value may be pertinent for another consumer business group, such as Content Insights group. In accordance with another embodiment, such data may be used to monitor peak concurrent usage by a specific region based on various dimensions of the event traffic, such as Play Attempts, Exit Before Video Start, Video Start Failures, Area Partition (Location), Asset Name, Date. Such business value may be pertinent for another consumer business group, such as Leadership.

The messaging bus 150 may comprise suitable logic, circuitry, and/or APIs that may be configured to provide a solution for end-to-end event streaming. The messaging bus 150 may be configured to publish (write) and subscribe to (read) streams of events, including continuous import/export of data from other systems, store streams of events durably and reliably for desired time duration, and process streams of events as they occur or retrospectively. An example of such a messaging bus may be Kafka® that is a distributed, highly scalable, elastic, fault-tolerant, and secure platform for event streaming.

Within the messaging bus 150, the events may be organized and durably stored in topics that may be multi-producer and multi-subscriber. The topics may be partitioned, i.e. spread over a number of "buckets" located on different Kafka brokers (servers that form the storage layer). When a new event is published to a topic, it is actually appended to one of the topic's partitions. Events with the same event key (e.g., a device ID) may be written to the same partition, and Kafka® guarantees that any consumer of a given topic-partition will always read that partition's events in exactly the same order as they were written.

The cloud object storage 152 may comprise suitable logic, circuitry, and/or APIs that may be configured to provide an object storage service. An example of such cloud object storage 152 may be Amazon S3® that offers scalability, data availability, security, and performance for virtually any use case, such as data lakes, cloud-native applications, and mobile apps. The basic storage units of Amazon S3® are objects which are organized into buckets. Each object may be identified by a unique, user-assigned key. Buckets may be managed using either the console provided by Amazon S3®, programmatically using the AWS SDK, or with the Amazon S3® REST API. Additionally, objects can be downloaded using, for example the HTTP GET interface and the BitTorrent® protocol.

The rate limiter 154 may be a defensive measure for an API or a service, such as enrichment layer, that may limit how much event traffic that the content distribution and optimization system 102 can receive from each of the client computing devices 108. In accordance with an embodiment of the present disclosure, the rate limiter 154 may not be applied on the boundary, but instrumented on the enrichment controller 144 so that the rate limiter 154 can still debug the spiked event traffic to see why the client computing devices emit thousands of events at that point and still use it for debugging purposes and putting on dead letter queue for offline analysis at a slower speed while still protecting the content distribution and optimization system 102 from fault tolerance of traffic spikes.

In operation, the rate limiter 154 instrumented at the enrichment controller 144 may receive the plurality of event traffic bursts in the first pod from the partition of the messaging bus 150 and configure a filtering rule for the device ID of the first client computing device 108a for checking rate limit of each event traffic burst.

The rate limiter 154 may determine whether the filtering rule is enabled (the first condition), whether the number of events corresponding to the event traffic burst generated by the first client computing device 108a exceeds the threshold value of rate limit of the event traffic burst (the second condition), and whether the first set of event traffic bursts from the plurality of event traffic bursts is blocked (the third condition). If all the three conditions are met, the enrichment controller 144 may store the blocked first set of event traffic bursts generated by the first client computing device 108a in the first pod and debug the blocked first set of event traffic bursts for offline analysis to protect the content distribution and optimization system 102 from fault tolerance of the event traffic bursts. If one or more of the three conditions are not met, the enrichment controller 144 may perform enrichment of the unblocked or the remaining second set of event traffic bursts from the plurality of event traffic bursts, publish the events in the messaging bus 150, and log the unblocked or the remaining second set of event traffic bursts in the cloud object storage 152.

In an exemplary scenario, load tests may be conducted for the enrichment controller 144 for approximately 8000 events per second (i.e. 140 events per second per deviceSerialNumber or deviceID). Corresponding experimental results may indicate that the instrumentation of the rate limiter 154 on the enrichment controller 144 for limiting event traffic results in consistent overall system latency at approximately 3.4 minutes. Further, there is not observed any increase in overall CPU, memory and pod count with rate limiter 154 off vs on. A decrease in memory may be observed is due to event spikes been filtered out from further processing in Kafka® pipeline. However, it should be noted that the above exemplary scenario is merely for illustrative purposes and should not be construed to be limiting. The readings may vary based on various external factors, such as system (CPU and memory) configuration, without any deviation from the scope of the disclosure.

Figure 2:
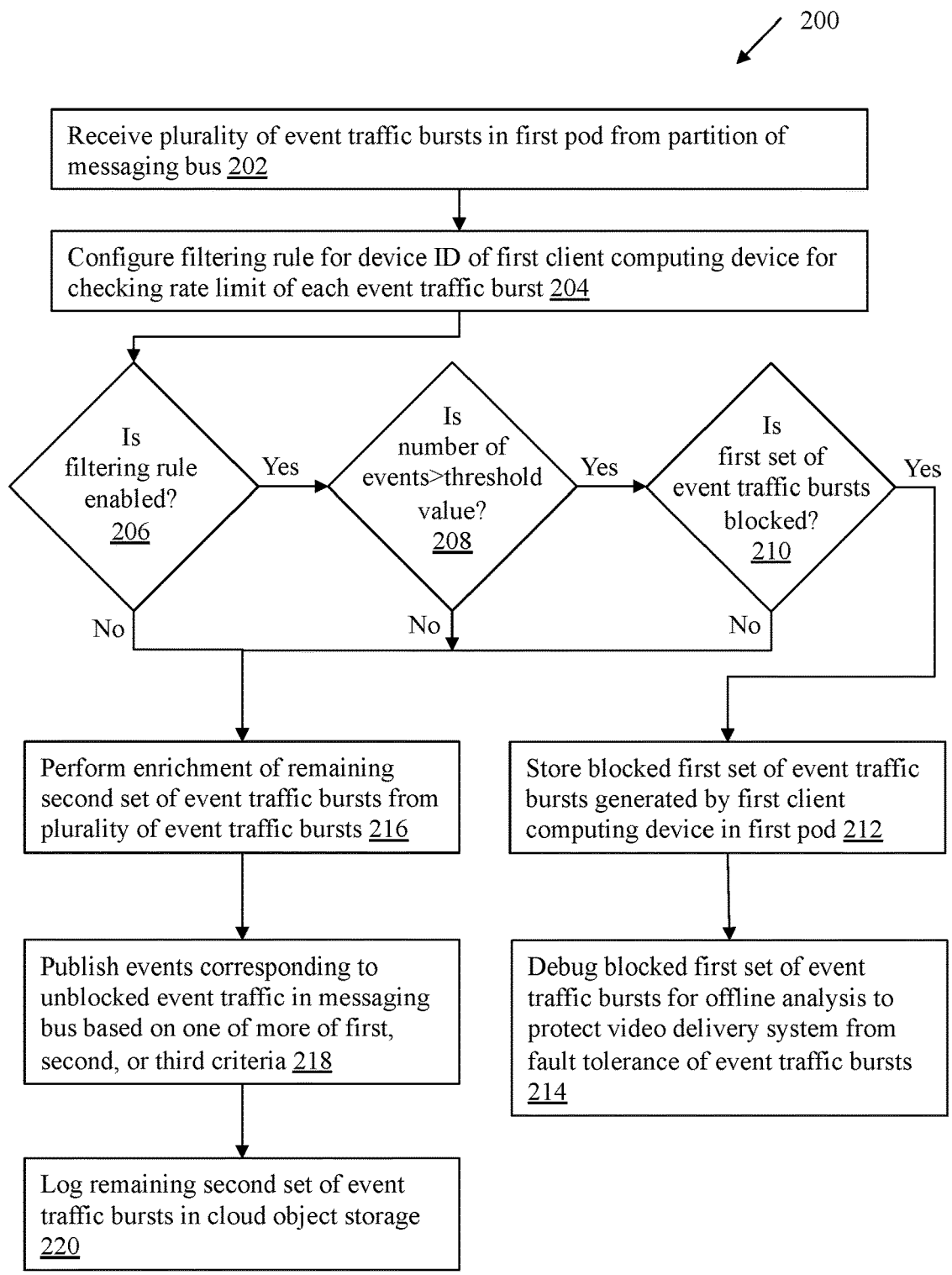
FIG. 2 is a flowchart for limiting event traffic for client computing devices, in accordance with an exemplary embodiment of the disclosure.

FIG. 2 is a flowchart 200 for limiting event traffic for client computing devices, in accordance with an exemplary embodiment of the disclosure. FIG. 2 is described in conjunction with FIGS. 1A and 1B.

At 202, a plurality of event traffic bursts is received in a first pod from a partition of the messaging bus 150. In accordance with an embodiment, the enrichment controller 144 may be configured to receive the plurality of event traffic bursts in the first pod from the partition of the messaging bus 150. For example, the plurality of event traffic bursts may be generated by a first client computing device 108a (from the client computing devices 108) and communicated to the partition of the messaging bus 150.

As discussed above, the messaging bus 150 corresponds to a framework implementation of a software bus using stream-processing that organizes the raw JSON records of the event traffic received from the serializer controller 142 and durably stores in topics that are multi-producer and multi-subscriber.

In accordance with an embodiment, each event traffic burst may correspond to a number of events in a time duration corresponding to a fixed window. For example, an event traffic burst (or a spike) may correspond to events at a high rate, such as more than 1000 requests per minute, from the client computing devices 108. In accordance with an embodiment, the events may correspond to heartbeat events received from the client computing devices 108 at frequent intervals, such as every 30 seconds. The heartbeat events fire from the DTC apps installed in the client computing devices 108 that describes the video QoS delivery status, for example, streaminitiate (indicating that the play has been initiated and the stream has been requested), videoqosstart (indicating that the video has started successfully playing), videoqosstatechange (indicating that content type is changing from main asset to an ad asset), videoqoserror (indicating that an error has occurred), videoqossend (indicating that the video has been sent), and the like.

In accordance with an exemplary scenario, spikes in the event traffic for three client computing devices with corresponding application launch timestamps, as shown below in Table 1, may be far beyond the regular traffic for videoqos events per minutes, which is generally 2 to 20 events.

TABLE 1

| Device ID | Timeframe | Events |
| --- | --- | --- |
| MTnR5oKoPT6ln0je+hNIp3dDWnfpPxuSV4mdqz62WaQ= | 2021-03-23 15:39:04.00 to 2021-03-23 15:39:25.00 | 11250 |
| ZbrIOh7IXmkErTSWoT3HHQKrcW/PbOmqKL9mQ3/+IcA= | 2021-03-23 15:30:35.00 to 2021-03-23 15:31:02.00 | 9778 |
| f9yFqD9Le2TFSFKTt4dXQPjXNX5Ane6UWZ7Z/Xjk28c= | 2021-03-23 15:01:36.00 to 2021-03-23 15:02:02.00 | 9323 |

Such spikes in the event traffic may be for few minutes only. Typical videoqos subtypes found in spikes may be videoqoserror, texttrackchange and videostatechange. Based on device serial number key of a client computing device, corresponding event traffic may be sent to the same partition of a topic located on different brokers (servers that form the storage layer) in the messaging bus 150. Every new event from the event traffic may be appended to the topic's partition. The messaging bus 150 guarantees that any consumer of a given topic-partition will always read that partition's events in exactly the same order as they were written.

From the partition of the messaging bus 150, the enrichment controller 144 may receive the plurality of event traffic bursts in the first pod of a plurality of pods created by the enrichment controller 144. Each pod from the plurality of pods may correspond to a single instance of a running process in a cluster and are automatically assigned a unique IP address. Each pod may contain one or more containers that may be managed as a single entity and share the resources, such as network (i.e., network namespace, including IP address and network ports) and storage, of the corresponding pod. Each pod is ephermal and has an API object (PodStatus), which is represented by a status field of the pod. The phase of a pod, such as pending, running, succeeded, failed or unknown, is a high-level summary of the pod in its current state.

The enrichment controller 144 may be configured to create a per pod in-memory lookup table corresponding to the client computing devices 108a in the memory associated with the enrichment layer. The enrichment controller 144 may consume the event traffic burst, generated by one client computing device and ingested in a topic of messaging bus 150 partitioned on a device ID, for example, deviceSerial- Number of the first client computing device 108a, in one pod. In accordance with an embodiment, the messaging bus 150, partitioned based on the device ID, may comprise a plurality of application launch timestamps corresponding to the application launch at the first client computing device 108a.

In accordance with an embodiment, for each pod, the corresponding lookup table may comprise at least a threshold value of rate limit of an event traffic burst generated by a corresponding client computing device, such as the first client computing device 108a. The threshold value of rate limit of the event traffic burst generated by the first client computing device 108a may determine whether one or more sets from the incoming event traffic bursts are to be blocked or not. Such selective blocking of the incoming event traffic bursts read from the partition of the messaging bus 150 may result in regulated event traffic and prevent overwhelming and lagging of the metrics aggregation engine 146.

Having a per pod in-memory lookup table created by the enrichment controller 144 may have various advantages. For example, no additional infrastructure may be required for the setup. Existing processing capability and memory allocation in the enrichment layer may handle such implementation without any degradation. Also, existing partitions of the messaging bus 150 are only used. Additionally, no changes are required to the sink of cloud object storage 152-cloud data warehouse 148. All events (including those blocked (or filtered out) in the flow of the messaging bus 150) may be stored in the cloud data warehouse 148 for analysis. Further, much faster lookup may be accomplished as compared to a dedicated database, for example, memory 0.34 ms vs Redis 2.45 m. Furthermore, faster to implement change is facilitated since videoqos metric drop is an ongoing incident.

At 204, a filtering rule may be configured for the device ID of the first client computing device 108a for checking rate limit of each event traffic burst. In accordance with an embodiment, the enrichment controller 144 may be configured to configure a filtering rule for the device ID of the first client computing device 108a for checking rate limit of each event traffic burst.

In an exemplary embodiment, a generic filtering rule may correspond to fixed window limits, such as 1000 events per minute or 10 requests per day. However, such fixed window limits may be subjected to spikes at the edges of the fixed window, as available quota resets. In an exemplary scenario, the pattern of event burst may be 300+ events per second for 30+ seconds. With fixed window, after 4 seconds all events from a client computing device may be blocked. Limiting a spike from 9000+ to 1000 event max, should give the metrics aggregation engine 146 sufficient time to process such events. It should be noted that the exemplary number of 1000 events per minute may be modified based on additional analysis, without any deviation from the scope of the disclosure.

According to the new rule, the maximum number of events (or requests) per client computing device allowed may be 1000, and length of the fixed window may be 60 seconds, starting on the minute. In such an embodiment, the filtering rule (i.e. the new rule) may be based on at least an IP address, a user ID, and a profile ID for checking rate limit of each event traffic burst. In accordance with an embodiment, the enrichment controller 144 may be configured to replay the events when the filtering rule is misconfigured.

At 206, it may be determined, according to a first condition, whether the filtering rule is enabled. In accordance with an embodiment, the enrichment controller 144 may be configured to determine whether the filtering rule is enabled.

In accordance with an embodiment, when the filtering rule is enabled, the control may pass to step 208. In accordance with another embodiment, when the filtering rule is not enabled, the control may pass to step 216.

At 208, it may be determined, according to a second condition, whether the number of events corresponding to the event traffic burst generated by the first client computing device 108a exceeds a threshold value of rate limit of the event traffic burst. In accordance with an embodiment, the enrichment controller 144 may be configured to determine whether the number of events corresponding to the event traffic burst generated by the first client computing device 108a exceeds the threshold value of rate limit of the event traffic burst. In accordance with an embodiment, when the number of events corresponding to the event traffic burst exceeds the threshold value, the control may pass to step 210. In accordance with another embodiment, when the number of events corresponding to the event traffic burst does not exceed the threshold value, the control may pass to step 216.

At 210, it may be determined, according to a third condition, whether a first set of event traffic bursts from the plurality of event traffic bursts is blocked. In accordance with an embodiment, the enrichment controller 144 may be configured to determine whether the first set of event traffic bursts from the plurality of event traffic bursts is blocked. In accordance with an embodiment, the first set of event traffic bursts from the plurality of event traffic bursts may be blocked until a new fixed window is assigned and the control may pass to step 212. In such case, the blocked event traffic bursts may be filtered out and next event traffic burst may be read out. In an exemplary scenario, the first client computing device 108a may be sending the event traffic as per the following Table 2:

TABLE 2

| Time | No. of events |
| --- | --- |
| 10:10:00 to 10:10:10 | 500 |
| 10:10:10 to 10:10:20 | 500 |
| 10:10:20 to 10:11:00 | 2000 |
| 10:11:01 to 10:11:10 | 500 |

In such an exemplary scenario, all event traffic bursts from 10:10:20 to 10:11:00 may be blocked, and other event traffic bursts may be allowed. In accordance with another embodiment, the first set of event traffic bursts from the plurality of event traffic bursts may not be blocked, and the control may pass to step 216.

At 212, the blocked first set of event traffic bursts generated by the first client computing device 108a may be stored in the first pod. In accordance with an embodiment, the enrichment controller 144 may be configured to store the blocked first set of event traffic bursts generated by the first client computing device 108a in the first pod.

At 214, the blocked first set of event traffic bursts may be debugged for offline analysis to protect the content distribution and optimization system 102 from fault tolerance of the event traffic bursts. In accordance with an embodiment, the enrichment controller 144 may be configured to debug the blocked first set of event traffic bursts for offline analysis to protect the content distribution and optimization system 102 from fault tolerance of the event traffic bursts.

At 216, an enrichment of remaining second set of event traffic bursts from the plurality of event traffic bursts may be performed. In accordance with an embodiment, the enrichment controller 144 may be configured to perform enrichment of the remaining second set of event traffic bursts from the plurality of event traffic bursts.

At 218, the events corresponding to the unblocked event traffic may be published in the messaging bus 150 based on one of more of the first, the second, or the third conditions. In accordance with an embodiment, the enrichment controller 144 may be configured to publish the events corresponding to the unblocked event traffic in the messaging bus 150 based on one of more of the first, the second, or the third conditions. The events corresponding to the unblocked traffic may be published in the messaging bus 150 from where the events may be read by the metrics aggregation engine 146. In accordance with an embodiment, the enriched event traffic communicated to the metrics aggregation engine 146 may be limited to a pre-defined rate for the first client computing device 108a based on the blocking of the first set of event traffic bursts.

At 220, the remaining second set of event traffic bursts may be logged in the cloud object storage 152. In accordance with an embodiment, the enrichment controller 144 may be configured to log the remaining second set of event traffic bursts in the cloud object storage 152. From the cloud object storage 152, the second set of event traffic bursts may be consumed by the cloud data warehouse 148.

Figure 3:
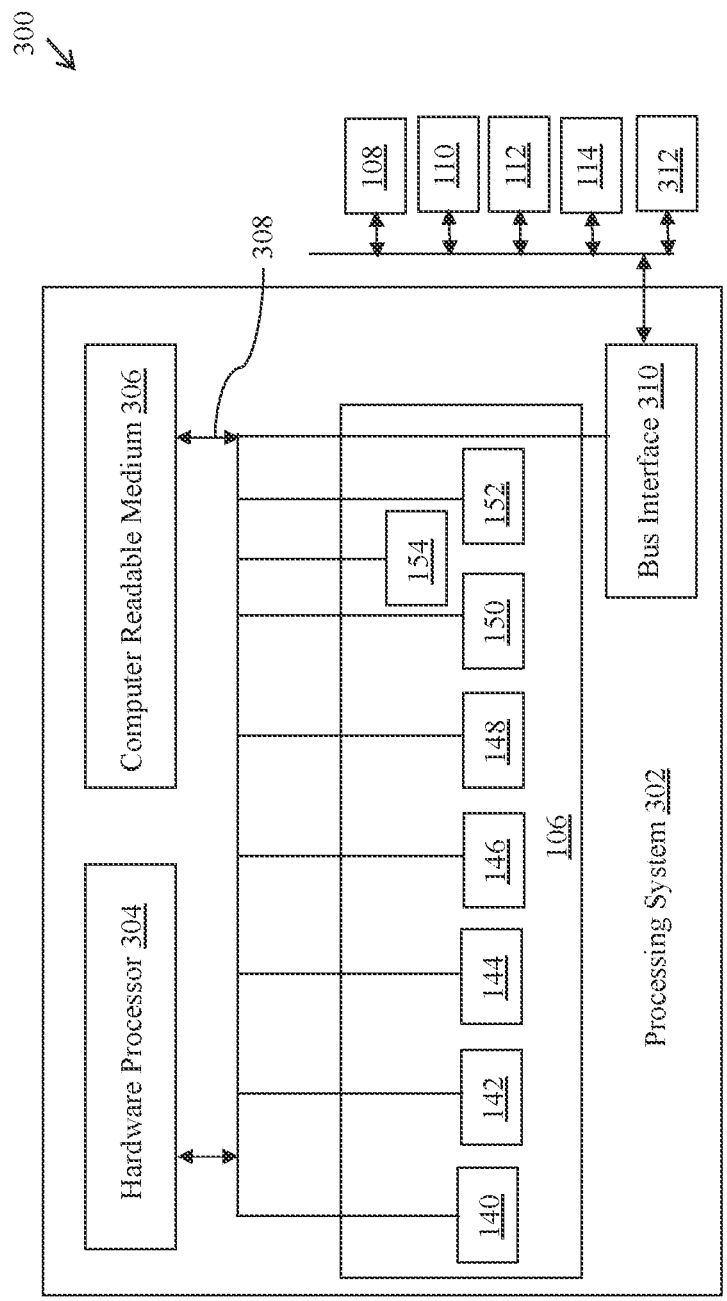
FIG. 3 is a conceptual diagram illustrating an example of a hardware implementation for the video optimization and monitoring system, in accordance with an exemplary embodiment of the disclosure.

FIG. 3 is a conceptual diagram illustrating an example of a hardware implementation for the video optimization and monitoring system 106 employing a processing system for limiting event traffic for client computing devices, in accordance with an exemplary embodiment of the disclosure. Referring to FIG. 3, the hardware implementation shown by a representation 300 for the video optimization and monitoring system 106 employs a processing system 302 for limiting event traffic for client computing devices, in accordance with an exemplary embodiment of the disclosure, as described herein.

In some examples, the processing system 302 may comprise one or more hardware processors 304, a non-transitory computer-readable medium 306, a bus 308, a bus interface 310, and a transceiver 312. FIG. 3 further illustrates the load balancer 140, the serializer controller 142, the enrichment controller 144, the metrics aggregation engine 146, the cloud data warehouse 148, the messaging bus 150, the cloud object storage 152 and the rate limiter 154.

The hardware processor 304 may be configured to manage the bus 308 and general processing, including the execution of a set of instructions stored on the computer-readable medium 306. The set of instructions, when executed by the processor 304, causes the video optimization and monitoring system 106 to execute the various functions described herein for any particular apparatus. The hardware processor 304 may be implemented, based on a number of processor technologies known in the art. Examples of the hardware processor 304 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 306 may be used for storing data that is manipulated by the processor 304 when executing the set of instructions. The data is stored for short periods or in the presence of power. The computer-readable medium 306 may also be configured to store data for one or more of the load balancer 140, the serializer controller 142, the enrichment controller 144, the metrics aggregation engine 146, the cloud data warehouse 148, the messaging bus 150, the cloud object storage 152 and the rate limiter 154.

The bus 308 is configured to link together various circuits. In this example, the video optimization and monitoring system 106 employing the processing system 302 and the non-transitory computer-readable medium 306 may be implemented with bus architecture, represented generally by bus 308. The bus 308 may include any number of interconnecting buses and bridges depending on the specific implementation of the video optimization and monitoring system 106 and the overall design constraints. The bus interface 310 may be configured to provide an interface between the bus 308 and other circuits, such as, the transceiver 312, and external devices, such as the client computing devices 108, the Ad decisioning servers 110, the external sources 112, and the published data sources 114.

The transceiver 312 may be configured to provide a communication of the video optimization and monitoring system 106 with various other apparatus, such as the client computing devices 108, the Ad decisioning servers 110, the external sources 112, and the published data sources 114. The transceiver 312 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 3 may include software whose corresponding code may be executed by at least one processor, for across multiple processing environments. For example, may include software that may be executed across a single or multiple processing environments.

In an aspect of the disclosure, the processor 304, the computer-readable medium 306, or a combination of both may be configured or otherwise specially programmed to execute the operations or functionality of the load balancer 140, the serializer controller 142, the enrichment controller 144, the metrics aggregation engine 146, the cloud data warehouse 148, the messaging bus 150, the cloud object storage 152 and the rate limiter 154, as described with respect to FIGS. 1A and 1B.

Various embodiments of the disclosure comprise the video optimization and monitoring system 106 in the content distribution and optimization system 102 that may include a hardware processor 304, that may correspond to the enrichment controller 144 in a data pipeline implemented in the content distribution and optimization system 102. The rate limiter 154 may be instrumented at the API, i.e. the enrichment layer, realized by the enrichment controller 144 configured for executing the instructions (stored in the memory, such as the computer-readable medium 306) to receive a plurality of event traffic bursts in a first pod from a partition of the messaging bus 150. The plurality of event traffic bursts is generated by the first client computing device 108a and communicated to the partition of the messaging bus 150. Each event traffic burst corresponds to a number of events in a time duration corresponding to a fixed window. The messaging bus 150 is partitioned based on a device ID of the first client computing device 108a and comprises a plurality of application launch timestamps. The rate limiter 154 may configure a filtering rule for the device ID of the first client computing device 108a for checking rate limit of each event traffic burst. The rate limiter 154 may block the first set of event traffic bursts from the plurality of event traffic bursts based on number of events corresponding to the event traffic burst exceeding a threshold value of rate limit of an event traffic burst generated by the first client computing device 108a until a new fixed window is assigned. Thus, the rate limiter 154 may limit the event traffic communicated to the metrics aggregation controller 146 to a pre-defined rate for the first client computing device 108a based on the blocking of the first set of event traffic bursts. The enrichment layer may perform the enrichment of remaining second set of event traffic bursts from the plurality of event traffic bursts.

Various embodiments of the disclosure may provide a non-transitory computer-readable medium, such as the non-transitory computer-readable medium 306, having stored thereon, computer implemented instruction that when executed by a processor causes the video optimization and monitoring system 106 to execute operations for limiting event traffic for client computing devices. The video optimization and monitoring system 106 may execute operations comprising receiving a plurality of event traffic bursts in a first pod from a partition of the messaging bus 150. The plurality of event traffic bursts is generated by the first client computing device 108a and communicated to the partition of the messaging bus 150. Each event traffic burst corresponds to a number of events in a time duration corresponding to a fixed window. The messaging bus 150 is partitioned based on a device ID of the first client computing device 108a and comprises a plurality of application launch timestamps. The video optimization and monitoring system 106 may execute operations comprising configuring a filtering rule for the device ID of the first client computing device 108a for checking rate limit of each event traffic burst. The video optimization and monitoring system 106 may execute operations comprising blocking the first set of event traffic bursts from the plurality of event traffic bursts based on number of events corresponding to the event traffic burst exceeding a threshold value of rate limit of an event traffic burst generated by the first client computing device 108a until a new fixed window is assigned. The video optimization and monitoring system 106 may execute operations comprising limiting the event traffic communicated to the metrics aggregation controller 146 to a pre-defined rate for the first client computing device 108a based on the blocking of the first set of event traffic bursts. The video optimization and monitoring system 106 may execute operations comprising performing the enrichment of remaining second set of event traffic bursts from the plurality of event traffic bursts.

Various components, as described above in FIG. 1B, provides the video optimization and monitoring system 106 with the capability to perform various functionalities associated with limiting the event traffic for the client computing devices 108. The rate limiter 154 instrumented at the enrichment layer is advantageous as compared to the ones instrumented at the other components due to various reasons. The design alternatives and the tradeoffs of different layers (further referred to as APIs or services) instrumented at different controllers/engines are summarized in the following Table 3:

TABLE 3

| | WAF layer (Load balancer 140) | Serialization layer (Serializer controller 142) | Enrichment layer (Enrichment controller 144) | Metrics aggregation layer (Metrics aggregation engine 146) |
| --- | --- | --- | --- | --- |
| Description | IP based rule on telegraph LB | Middleware that returns a 429 or BAD REQUEST response | Per pod, in-memory lookup | Custom Kafka ® consumer for Flink ® |
| Device specific filtering | No | Yes | Yes | No |
| Filtered events are stored | No | No | Yes | Yes |
| Events can be replayed | No | No | Yes | Limiting reads from one partition can cause event loss |
| Additional infrastructure | Minimal | Redis backend | No | No |
| Impact to client response time | None | 4-8 ms increase based on commerce front end. | None | No |
| Additional rules setup or other keys | Limited | Yes | Yes | No |

Thus, the rate limiter 154 instrumented at the enrichment layer in the proposed video optimization and monitoring system 106 is advantageous as per-device traffic coming to the metric aggregation engine 146 may be limited to a reasonable rate (for example, 100 per minute) and events from the spike may be stored in persistent storage for further analysis. Events may be replayed in case the filtering rule is misconfigured. Additional rules may be configured based on IP address, userID, profileID, and the like. Further, the API response time of the serializer controller 142 remains unchanged.

As utilized herein the terms "circuits" and "circuitry" 'refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for limiting event traffic for client computing devices.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system comprising memory for storing instructions; and one or more processors configured to execute the instructions to:
    receive a plurality of event traffic bursts in a pod from a partition of a messaging bus,
        wherein the plurality of event traffic bursts is generated by a client computing device and communicated, via a serialization controller, to the partition of the messaging bus,
        wherein an event traffic burst of the plurality of event traffic bursts corresponds to a number of events in a time duration corresponding to a fixed window, and wherein the messaging bus is partitioned based on a plurality of device identifiers (IDs), the partition corresponds to a device ID of the client computing device, and the partition is associated with a plurality of application launch timestamps corresponding to an application at the client computing device; and in response to the number of events exceeding a threshold value of a rate limit, store the number of events in the pod until a new fixed window is assigned, wherein the threshold value of the rate limit is defined by a filtering rule corresponding to the device ID and an application program interface (API) response time corresponding to the serialization controller remains unchanged.

2. The system of claim 1, wherein the one or more processors are further configured to:
publish the number of events in a cloud data warehouse based on one or more of a first, a second, or a third condition.

3. The system of claim 2, wherein, in accordance with the first condition, the rate limit is disabled.

4. The system of claim 2, wherein, in accordance with the second condition, the threshold value exceeds the number of events corresponding to the event traffic burst.

5. The system of claim 2, wherein, in accordance with the third condition, one or more event traffic bursts of the plurality of event traffic bursts are unblocked.

6. The system of claim 1, wherein the one or more processors are further configured to:
create a per pod lookup table in the memory and that corresponds to the pod, wherein the per pod lookup table (a) corresponds to a plurality of client computing devices that include the client computing device and (b) comprises one or more threshold values of one or more rate limits that respectively correspond to one or more event traffic bursts generated by one or more of the plurality of client computing devices.

7. The system of claim 1, wherein the one or more processors are further configured to:
debug the event traffic burst for offline analysis to protect a content distribution and optimization system from fault tolerance of the plurality of event traffic bursts.

8. The system of claim 1, wherein the one or more processors are further configured to:
replay the number of events when the filtering rule is misconfigured.

9. The system of claim 1, wherein the filtering rule is configured based on at least an internet protocol (IP) address, a user ID, and a profile ID for checking the rate limit of the event traffic burst.

10. The system of claim 1, wherein the one or more processors are further configured to:
log one or more event traffic bursts in a cloud object storage, wherein the one or more event traffic bursts are consumed by a cloud data warehouse from the cloud object storage.

11. A method, comprising:
receiving, by one or more processors, a plurality of event traffic bursts in a pod from a partition of a messaging bus,
wherein the plurality of event traffic bursts is generated by a client computing device and communicated, via a serialization controller, to the partition of the messaging bus,
wherein an event traffic burst of the plurality of event traffic bursts corresponds to a number of events in a time duration corresponding to a fixed window, and wherein the messaging bus is partitioned based on a plurality of device identifiers (IDs), the partition corresponds to a device ID of the client computing device, and the partition is associated with a plurality of application launch timestamps corresponding to an application at the client computing device; and in response to the number of events exceeding a threshold value of a rate limit, storing, by the one or more processors, the number of events in the pod until a new fixed window is assigned, wherein the threshold value of the rate limit is defined by a filtering rule corresponding to the device ID and an application program interface (API) response time corresponding to the serialization controller remains unchanged.

12. The method of claim 11, further comprises publishing the number of events based on one or more of a first, a second, or a third conditions.

13. The method of claim 12, wherein, in accordance with the first condition, the rate limit is disabled.

14. The method of claim 12, wherein, in accordance with the second condition, the threshold value exceeds the number of events corresponding to the event traffic burst.

15. The method of claim 12, wherein, in accordance with the third condition, one or more event traffic bursts of the plurality of event traffic bursts are unblocked, wherein the one or more event traffic bursts are logged in a cloud object storage.

16. The method of claim 11, further comprising creating a per pod lookup table in a memory and that corresponds to the pod, wherein the per pod lookup table (a) corresponds to a plurality of client computing devices that include the client computing device and (b) one or more threshold values of one or more rate limits that respectively correspond to one or more event traffic bursts generated by one or more of the plurality of client computing devices.

17. The method of claim 11, further comprising:
debugging the event traffic burst for offline analysis to protect a content distribution and optimization system from fault tolerance of the plurality of event traffic bursts.

18. The method of claim 11, further comprising:
replaying the number of events when the filtering rule is misconfigured.

19. The method of claim 11, wherein the filtering rule is configured based on at least an internet protocol (IP) address, a user ID, and a profile ID for checking the rate limit of the event traffic burst.

20. A non-transitory computer-readable medium having stored thereon, computer executable instructions that, when executed by one or more processors, cause the one or more processors to:
receive a plurality of event traffic bursts in a pod from a partition of a messaging bus,
wherein the plurality of event traffic bursts is generated by a client computing device and communicated, via a serialization controller, to the partition of the messaging bus,
wherein an event traffic burst of the plurality of event traffic bursts corresponds to a number of events in a time duration corresponding to a fixed window, and
wherein the messaging bus is partitioned based on a plurality of device identifiers (IDs), the partition corresponds to a device ID of the client computing device, and the partition is associated with a plurality of application launch timestamps corresponding to an application at the client computing device; and in response to the number of events exceeding a threshold value of a rate limit, store the number of events in the pod until a new fixed window is assigned, wherein the threshold value of the rate limit is defined by a filtering rule corresponding to the device ID and an application program interface (API) response time corresponding to the serialization controller remains unchanged.

* * * * *